United States Patent Office 3,562,270
Patented Feb. 9, 1971

3,562,270
FLUORINATED 1,2,4-BENZOTRIAZINES
Theodor Wagner-Jauregg, Zofingen, Switzerland, and Egon Fitz, Dornbirn, Austria, assignors to Siegfried Aktiengesellschaft, Zofingen, Switzerland, a corporation of Switzerland
No Drawing. Filed Sept. 27, 1968, Ser. No. 763,394
Claims priority, application Switzerland, Sept. 27, 1967, 13,518/67
Int. Cl. C07d 55/10
U.S. Cl. 260—249.5
4 Claims

ABSTRACT OF THE DISCLOSURE

This invention is directed to fluorinated 3-amino substituted 1,2,4-benzotriazine derivatives having pharmaceutical and particularly antiphlogistic activity, and to the method of producing same by reducing the corresponding fluorinated 3-amino substituted 1,2,4-benzotriazine-1-oxide derivatives.

---

The present invention relates to therapeutically valuable fluorinated compounds of the general formula

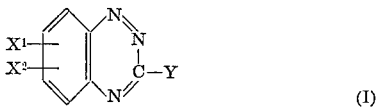

(I)

wherein $X_1$ and $X_2$ are identical or different members selected from the group consisting of hydrogen, halogen and lower alkyl radicals, but at least one X being a member selected from the group consisting of fluorine and fluorinated lower alkyl, that is, lower alkyl radicals substituted by at least one fluorine atom, and Y is a tertiary amino group.

The novel compounds of the invention are preferably prepared by treating a 1,2,4-benzotriazine-1-oxide derivative of the general formula

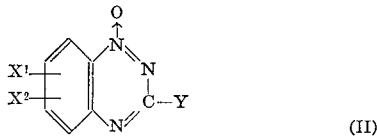

(II)

wherein $X^1$ and $X^2$ and Y have the above mentioned signification, with a reducing agent and, if the reduction proceeds to the formation of the corresponding 1,2-dihydro-1,2,4-benzotriazine derivative, by subsequent treatment of the reduction product with a mild oxidizing agent.

The compounds represented by Formula I have pharmocological properties and are in particular useful as antiphlogistic agents for alleviating the symptoms of rheumatic and allergic diseases in mammels. For example in the rat paw aerosil edema test (Helv. Physiol. Acta 21, 65 (1963)) with peroral administration of 3-dimethylamino-7-fluoro-1,2,4-benzotriazine and 3-dimethylamino-7-trifluoromethyl-1,2,4-benzotriazine in an aqueous suspension (5%) containing 5% gum acacia, $ED_{50}$ values of 24 and 30 mg./kg. rat respectively were determined, showing that the said compounds have very high antiphlogistic activities.

The process of the invention may be carried out by using any known reduction method, such as catalytic hydrogenation or reaction with suitable metals such as tin, zinc or iron in the presence of a mineral acid, or reaction with suitable metal salts, such as $SnCl_2$, $FeCl_2$, etc. If stronger reducing agents are used it should be noted that the reduction is generally caused thereby to proceed to the formation of the corresponding 1,2-dihydro-1,2,4-benzotriazine compounds which however can be easily converted to the not hydrogenated benzotriazine compounds by the action of a mild oxidizing agent, such as atmospheric oxygen. Therefore it may be left to the chemist skilled in the art to select a suitable reducing agent. As a general guidance, it may be stated that the desired benzotriazine compounds are directly obtained by using as a reducing agent a metal which in a weakly acid or alkaline medium liberates nascent hydrogen, for example zinc dust in an aqueous solution of ammonium chloride or caustic soda, whereas other metals such as tin in the presence of tydrochloric acid result in the formation of the corresponding 1,2-dihydro benzotriazine compounds. In order to avoid the trouble of determining the exact conditions for the direct reduction to the benzotriazine compound it is in general advantageous to use a strong reducing agent, the more as the higher reaction rates of strong reducing agents allow shorter reaction times; the conversion to the desired benzotriazine compound can be accomplished by simply passing a stream of air through the solution of the reduction product.

The fluorinated 1,2,4-benzotriazine-1-oxides which are used as a starting material for the method of the present invention can be prepared by known methods for example from p-fluoro-o-nitro aniline (J. Org. Chem. 16, 1451 (1951)) or p-trifluoromethyl-o-nitroaniline (Chem. Abstr. 54, 4430g (1960)) whose amino radical is converted to the ureido radical by treating the said compounds with phosgene dissolved in toluene and subsequently with an aqueous solution of ammonia. By heating with an aqueous solution of sodium hydroxide (having a concentration of, e.g., 70%) the so obtained intermediate product is cyclized to give 3-hydroxy-7-fluoro-1,2,4-benzotriazine-1-oxide and 3-hydroxy-7-trifluoromethyl-1,2,4-benzotriazine-1 - oxide. By treatment of the said compounds with phosphorus oxychloride and dimethylaniline their hydroxy radical is replaced by a chlorine atom, for which an amino radical is substituted by reaction with an amine, e.g., with an alcoholic solution of dimethylamine.

EXAMPLE 10 g. 3-dimethylamino-7-fluoro-1,2,4 - benzotriazine-1-oxide are dissolved in 200 ml. methanol. After addition of a palladium catalyst (5% Pd on charcoal) the mixture is agitated at 20° C. in the presence of hydrogen of atmospheric pressure. When after about half an hour no further absorption of hydrogen is observed, the mixture is filtered through diatomite. After having passed during 2 hours a weak stream of air through the solution, crude 3-dimethylamino-7-fluoro-1,2,4-benzotriazine precipitates in the form of long needles, which are separated by filtration. Further amounts of the substance are obtained by concentrating the mother liquor. The combined crude products are purified by crystallization from methanol. Yield: 5 g. (55%); M.P.: 127–128° C.

Calc'd for $C_9H_9FN_4$ (283.73) (percent): F, 9.89; N, 29.15. Found (percent): F, 9.57; N, 29.32.

In an analogous manner 3-dimethylamino-7-trifluoromethyl-1,2,4-benzotriazine (M.P.: 100–101° C.) and 3-(methyl-phenyl-amino) - 7-trifluoromethyl - 1,2,4-benzotriazine (M.P.: 103–105° C.) are obtained by catalytical hydrogenation of 3-dimethylamino-7-trifluoromethyl-1,2,4-benzotriazine-1-oxide and 3-(methyl-phenyl-amino)-7-trifluoromethyl-1,2,4-benzotriazine-1-oxide respectively.

We claim:
1. A fluorinated 1,2,4-benzotriazine derivative having the formula

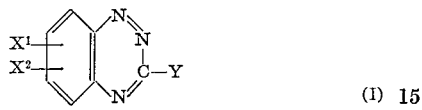

(I)

wherein $X^1$ and $X^2$ are independently selected from the group consisting of hydrogen, halogen, fluorinated lower alkyl, and lower alkyl, at least one of $X^1$ and $X^2$ being a member selected from the group consisting of fluorine and fluorinated lower alkyl, and Y is selected from the group consisting of di-loweralkyl amino and lower alkyl-phenyl amino.

2. A compound according to claim 13, wherein Y is a di-loweralkyl amino radical.

3. A compound according to claim 1, wherein $X^1$ is a member selected from the group consisting of fluorine and trifluoromethyl and $X^2$ is hydrogen.

4. A compound according to claim 3, wherein Y is di-loweralkyl amino.

References Cited

UNITED STATES PATENTS

| | | | |
|---|---|---|---|
| 2,388,608 | 11/1945 | Emerson | 260—689X |
| 3,079,390 | 2/1963 | Jiu et al. | 260—249.5 |
| 3,137,693 | 6/1964 | Carbon | 260—249.5X |
| 3,386,991 | 6/1968 | Gerber | 260—689X |

JOHN M. FORD, Primary Examiner

U.S. Cl. X.R.

424—249; 260—248